United States Patent Office 3,096,439
Patented July 2, 1963

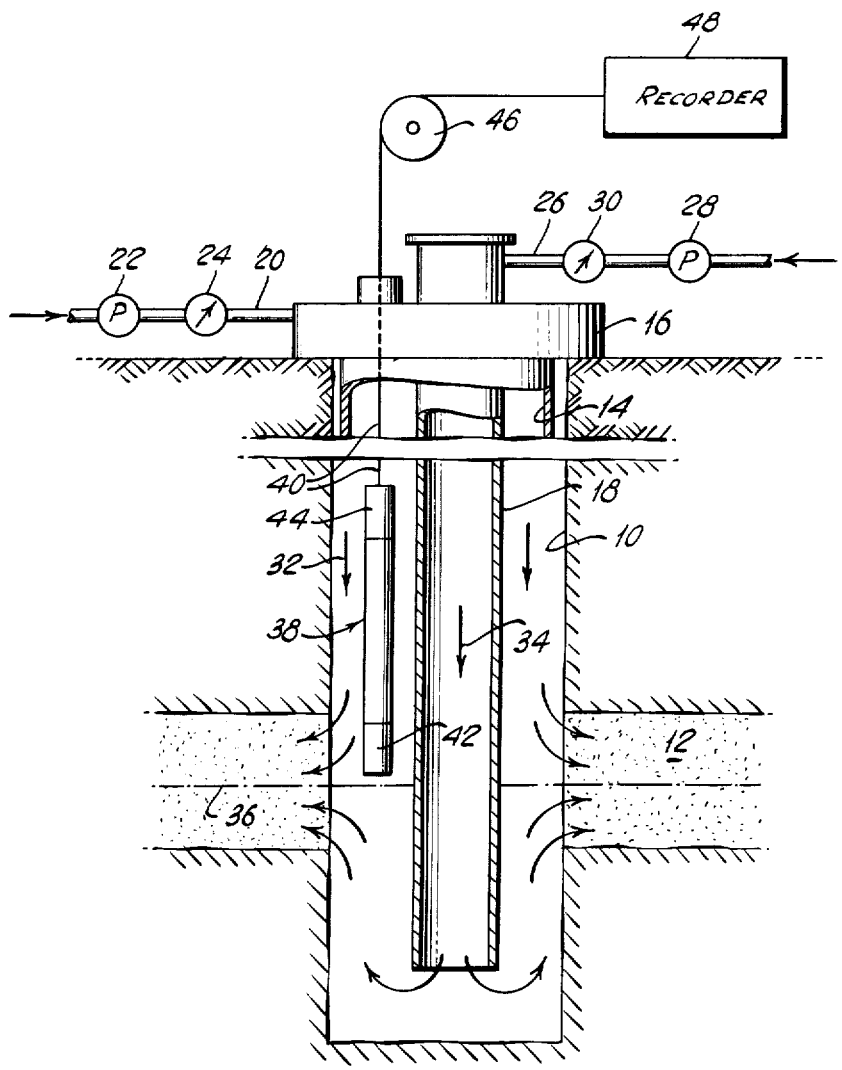

3,096,439
SUBSURFACE EXPLORATION
Alexander S. McKay, Houston, Tex., assignor to Texaco Inc., a corporation of Delaware
Filed Dec. 12, 1958, Ser. No. 780,060
4 Claims. (Cl. 250—43.5)

This invention relates to a method and apparatus for studying subsurface earth formations traversed by a borehole and more particularly to a method and apparatus for making a profile log of fluids passing through the wall of a borehole. One aspect of this invention relates to a method of and apparatus for measuring or determining the permeability of the earth's formations traversed by a well or borehole. The term permeability is used herein in the broad sense as meaning the relative receptibility of the permeable formations to the ingress of fluid as influenced by the applied pressure of the fluid and the varying back pressures in various strata, and is not used in the technical sense of the measured permeability of the removed rock in millidarcys as defined by Darcy's law.

Knowledge of the permeability of the subsurface formation in petroleum operations is of considerable importance in secondary recovery operations for the production of oil from subsurface formations. In secondary recovery operations, a fluid for example, water, oil or gas, is pumped into an injection well located at a point remote from an oil producing well and directed into a given formation or vertical interval of the injection well to urge oil which may be contained therein toward the producing well. In order to determine whether the fluid pumped into the injection well is being efficiently injected into the given formation, the amount of fluid passing into various vertical increments of the wall of the injection well must be known. A log which indicates the vertical increments of the injection well through which fluid is entering into the subsurface formations and the amount of fluid flowing into each increment is sometimes referred to as an injectivity profile or permeability log of the well and a log which indicates the vertical increments of the production well into which fluid is entering from the subsurface formations and the amount of fluid flowing into each increment is sometimes referred to as a productivity profile log of the well.

A method of obtaining an injectivity profile or permeability log of a well or a particular formation traversed by a borehole has been described in U.S. Patent 2,700,734, grated to Edmond F. Egan and Gerhard Herzog on January 25, 1955. In the patented method two streams of fluid are introduced into a well, one stream passing through a string of tubing extending downwardly to a point below the formation of interest and the other stream passing downwardly through the annular space between the tubing and the casing or the wall of the well. The streams are introduced or pumped into the well simultaneously and each stream is carefully metered at the surface. The fluid pumped down through the tubing will, after filling the exposed portion of the well below the tubing, flow upwardly around the tubing until it meets the fluid flowing downwardly through the annular space, thus forming an interface between the two streams or bodies of fluid. In order to locate the interface between the two streams a small amount of tracer material, such as a radioactive substance may be added to one of the streams before it enters the well so that all the fluid in this stream will be radioactive, while the other stream will be non-radioactive. The depth in the well at which the interface lies may be readily located by lowering a detector for example a radiation detector into the well and simultaneously and continuously recording the depth of the detector and the output signals therefrom. The response of the detector will change abruptly when the detector passes from the radioactive fluid into the non-radioactive fluid or vice versa.

In order to determine the amount of fluid that is entering into a vertical increment of the formation of interest, the rates of injection of each of the two streams are varied but sum of the rates are maintained constant. By changing the ratio of the amount of the radioactive fluid to the amount of non-radioactive fluid injected into the well, the interface will be forced to move to another depth in the well. The difference in the amount of either of the fluids injected into the well is the amount of fluid that is entering the vertical increment in the formation between the two interfaces. It can be seen that by making appropriate changes in the ratio of the amount of radioactive fluid to the amount of non-radioactive fluid pumped into the well the interface can be moved in a number of steps through the well past the formation of interest to provide an accurate log of the permeability of the formation. The length of each of the vertical increments between the successive interfaces depends upon the amount of change of the rates of the two streams and the permeability of the increment. After each adjustment or change in the rates of the two streams and after the well fluids have been stabilized, the rate of flow of the two streams is noted and the radiation detector is passed through the well to determine the depth of the interface. Accordingly it can be seen that in this manner an injectivity profile log is made of a formation which clearly shows the relative permeabilities of the various vertical increments of the formation.

In the method of producing an injectivity profile log, as described in the above mentioned patent, the radioactive substance is introduced into one of the two streams at the surface of the earth and under ordinary surveying conditions the method has proved to be very satisfactory.

A method of obtaining a productivity profile log of a well or a particular formation traversed by a borehole has been described in U.S. patent application having Serial No. 463,998, filed by E. F. Egan, G. Herzog and A. S. McKay on October 22, 1954, now Patent No. 2,947,869. In the practice of the productivity method as described in the above mentioned application, the borehole is provided with a string of tubing extending downwardly at least to the bottom of a producing formation. The flow rates of fluids passing upwardly through both the tubing and the annular space between the tubing and the casing or the wall of the borehole are controlled so that there will be a depth in the zone of interest at which the fluid flow divides into the tubing stream and the annulus stream. This point or depth may be called a "null point" or interface. All fluids above the null point flow upwardly in the annulus and all fluid below the null point flow downwardly into the lower end of the tubing and then upwardly to the surface. The position of this null point or interface can be moved up or down along the wall of the borehole by varying the flow rates of the two fluid streams. In order to locate the null point or interface between the two streams a neutron-reactive substance is added to one of the two streams through a string of small tubing at a known point in the zone of interest, and a source of neutrons and a neutron detector disposed in spaced relation to the source are lowered into the borehole to determine which of the two streams contain the neutron-reactive substance. By moving the string of tubing to different depths the interface can be readily detected by noting the point or depth at which the neutron-reactive substance is initially added to the other of the two streams and by changing the relative rates of flow of the two fluid streams the interface may be moved to a new location and the profile log thus made in a manner similar to that in which the above-described injectivity log is made.

In accordance with the present invention, the injectivity and productivity techniques heretofore employed have been improved by producing in the borehole and there introducing into one of the fluid streams the radioactive tracer while still maintaining the inherent advantages of the known radioactivity techniques. In the practice of the present invention a neutron generator adapted to emit thermal neutrons is disposed in the borehole in the vicinity of the zone of interest and in the vicinity of a stream having a substance containing neuclei that will become unstable or radioactive after capturing one or more thermal neutrons from the neutron generator and a suitable radiation detector is disposed a short distance from the neutron generator.

For a better understanding of the invention, reference may be had to the accompanying drawing in which the single figure is a vertical sectional view through a portion of a borehole traversing a permeable formation showing the arrangement therein of apparatus including an exploring unit used in accordance with this invention.

Referring to the single figure of the drawing there is shown a borehole 10 traversing a permeable formation 12 the permeability of which is to be determined. The upper portion of the borehole 10 is lined with a casing 14 having a closed casing head 16 at the surface. A string of tubing 18 extends downwardly into the borehole to a depth below the formation 12. At the surface a first inlet pipe 20 is connected through the casing head 16 to the annular space between the tubing 18 and the casing 14. In the pipe 20 is a first pump 22 and a first flow meter 24. A second inlet pipe 26 is connected to the interior of the tubing 18. In the second pipe 26 is a pump 28 and a flow meter 30. The pumps 28 and 22 control, respectively, the flow rate of a first fluid 32 which flows downwardly through the annulus between the tubing 18 and the wall of the borehole 10 and a second fluid 34 which flows downwardly through the tubing 18. Under these conditions there is a depth or location in the annular space at which the first and second fluids 32 and 34 form an interface 36. This interface as is well known can be moved up or down along the wall of the formation 12 by changing the flow rates of the two fluids 32 and 34 while maintaining constant the sum of the flow rates thereof. By locating the interface 36 for various ratios of flow rates of the two fluids and by noting the change in the flow rates of at least one of the fluids, the injectivity profile of a given formation can be readily determined, as disclosed in the above mentioned patent.

Two pumps 22 and 28 have been illustrated in the figure of the drawing but it should be understood that one common pump or pressure source for both annulus and tubing fluids may be used when the annulus and tubing fluids are like fluids. The pumped fluid can be subsequently divided into two separately metered streams by the use of a two-way proportioning valve, thus to more easily maintain a constant total injection rate.

In accordance with this invention the location of the interface for each ratio of flow rates is determined by disposing in the vicinity of the permeable formation an elongated exploring unit 38 having a generator of thermal neutrons 44 at one end thereof and a detector of a radioactive tracer material 42 at the opposite end thereof. The exploring unit 38 is supported by a cable 40 which in addition to supporting the exploring unit 38 is used to transmit signals from the detector 42 to a recorder 48 located at the earth's surface. The location of the exploring unit 38 in the borehole may be continuously recorded by a cable measuring device 46 whihc engages the cable 40 and is adapted to measure continuously the length of the cable payed out and thus the depth of the exploring unit 38. A non-radioactive substance containing a nucleus that is capable of becoming unstable or radioactive after capturing one or more thermal neutrons from generator 44 is added to the fluid 32 which is introduced into the annular space by pump 22. The radioactive nuclei produced in the stream will move toward the interface 36 and will be detected by the detector 42 provided the radiation detector is located above the interface 36. The location of the interface is determined by noting an abrupt change in the output of the detector 42 as the exploring unit 38 is moved through the zone of interest. More specifically, the injected fluid 32 may contain a soluble manganese salt which when passing the thermal neutron generator 44 of the exploring unit 38 captures thermal neutrons therefrom to produce radioactive manganese which may be detected downstream by the radiation detector 42. It should be understood that the invention is not limited to the use of manganese since a number of other elements, such as, sodium, magnesium, chlorine, or potassium may be used. The housing of the exploring unit 38 may be in the form of a length of plastic pipe and the thermal neutron generator contained therein may comprise for example, a conventional radium:beryllium, polonium:beryllium or actinium:beryllium neutron source of, say, 10 curie strength surrounded by a suitable moderator employing, for example, a hydrogenous material and spaced from the radiation detector 42 by a distance of, for example, ten feet. The formation and the borehole fluid may serve as the hydrogenous material.

It can be seen that the present invention eliminates the need of surface equipment for introducing the radioactive tracer into one of the fluid streams and the added inconvenience of having to transport a suitable radioactive tracer material from a distant source of supply. Furthermore, the health hazard to operating personnel is minimized by the use of the method of this invention.

The invention as thus far described relates to the location of a single interface in the borehole. However, it should be understood that the invention is not limited to the single interface method of determining subsurface formation permeabilities. Another method contemplated within the scope of this invention is the two interface method of obtaining a permeability log, as described in a copending application of A. S. McKay, filed December 23, 1957, and having Serial No. 704,814, now U.S. Patent 2,993,119. In the two interface method three streams of fluid are introduced into the borehole forming two interfaces therein, the rate of flow of the stream introducing the fluid into the subsurface formations between the two interfaces is generally held constant throughout the survey while the ratios of the flow rates of the other two streams are varied, and the sum of the flow rates of the three streams is always held constant. Each of the two interfaces formed in the practice of this method may then be located in accordance with the teachings of this invention for each ratio of flow rates of the two variable streams.

Furthermore the method and apparatus of this invention may be employed when it is desired to selectively treat a specific zone or subsurface formation by utilizing the three fluid or two interface technique described in the copending application of Alexander S. McKay and Edmond F. Egan having Serial No. 456,002, filed September 14, 1954, now U.S. Patent 2,869,642.

Although it has been indicated hereinabove that the exploring unit contains a neutron generator spaced a few feet above a radiation detector, it should be understood that in accordance with this invention the positions of the generator and the detector may be interchanged and the substance to be irradiated with neutrons added to the stream passing through the tubing.

As described hereinabove the substance to be irradiated is added to one of the two streams at the earth's surface, pumped into the borehole and irradiated in the vicinity of the neutron generator. As an alternative a bulk of non-radioactive substance to be irradiated may be disposed on or near the exploring unit so as to capture thermal neutrons from the generator and to be lowered into the borehole therewith. The radioactive substance may then be dissolved by and carried with the stream passing the exploring unit. It can be readily seen that this embodiment of the invention is particularly suitable to productivity profile logging as well as injectivity profile logging.

The exploring units disclosed hereinabove may be disposed in the tubing as well as in the annular space between the tubing and the wall of the borehole.

By producing the radioactive isotope in the borehole a tracer having a short half-life may be used to further minimize health hazard to operating personnel. More specifically, non-radioactive selenium or chlorine may be used to produce radioactive selenium $Se^{81}$ having a 17 minute half-life or radioactive chlorine $Cl^{38}$ having a 38 minute half-life, respectively.

Obviously, many modifications and variations of the invention as hereinabove set forth may be made without departing from the spirit and scope thereof and therefore only such limitations should be made as are indicated in the appended claims.

I claim:

1. A method of locating an interface between two fluid streams flowing through the wall of a borehole traversing a subsurface formation which comprises disposing in one of said two streams a thermal neutron source and a non-radioactive substance containing nuclei capable of becoming unstable after capturing one or more of the thermal neutrons from said source to produce in said one of said two streams at a known point in the vicinity of said subsurface formation a radioactive tracer material, detecting the presence of said tracer material at a point spaced vertically about 10 feet from said known point to determine the direction of flow of said one stream, and repeating the above operations at different known depths until a change in the direction of flow of one stream containing said tracer material has been noted.

2. A method of locating an interface between two fluid streams flowing through the wall of a borehole traversing a subsurface formation which comprises adding to one of said two streams a non-radioactive substance containing nuclei capable of becoming unstable after capturing one or more thermal neutrons, disposing in said one stream a source of thermal neutrons so as to produce a radioactive tracer material in said one stream at a known point in the vicinity of said subsurface formation, detecting the presence of said tracer material at a point spaced vertically about 10 feet downstream from said known point, and repeating the above operations at different known depths until a change in the direction of flow of said one stream containing tracer material has been noted.

3. In a method of locating an interface between two fluid streams flowing through the wall of a borehole traversing a subsurface formation the improvement which comprises disposing in one of said two streams a source of thermal neutrons and a bulk of non-radioactive substance containing nuclei capable of becoming unstable after capturing one or more of the thermal neutrons from said source, in order to produce in said one stream at a known point in the vicinity of said subsurface formation a radioactive tracer material, detecting the presence of said tracer material at a point spaced vertically about 10 feet downstream from said known point, and repeating the above operations at different known depths until a change in the direction of flow of said one stream containing tracer material has been noted.

4. A method as set forth in claim 1 wherein said one stream contains a manganese salt solution, and wherein a radium:beryllium source of thermal neutrons is disposed in said one stream to produce said radioactive tracer material.

References Cited in the file of this patent
UNITED STATES PATENTS

| | | |
|---|---|---|
| 2,443,680 | Herzog | June 22, 1948 |
| 2,480,674 | Russell | Aug. 30, 1949 |
| 2,583,288 | Arps | Jan. 22, 1952 |
| 2,648,014 | Arthur | Aug. 4, 1953 |
| 2,700,734 | Egan et al. | Jan. 25, 1955 |
| 2,868,506 | Nestle | Jan. 13, 1959 |
| 2,947,869 | Egan et al. | Aug. 2, 1960 |